United States Patent
Nitschke et al.

(10) Patent No.: US 10,913,678 B2
(45) Date of Patent: *Feb. 9, 2021

(54) VACUUM MOLD SHUTTLE SYSTEM FOR A GLASS SHEET FORMING SYSTEM

(71) Applicant: GLASSTECH, INC., Perrysburg, OH (US)

(72) Inventors: David B. Nitschke, Perrysburg, OH (US); Kenneth J. Lane, Bowling Green, OH (US); Dean M. Nitschke, Maumee, OH (US)

(73) Assignee: GLASSTECH, INC., Perrysburg, OH (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/772,918

(22) PCT Filed: Nov. 2, 2016

(86) PCT No.: PCT/US2016/060090
§ 371 (c)(1),
(2) Date: May 2, 2018

(87) PCT Pub. No.: WO2017/079275
PCT Pub. Date: May 11, 2017

(65) Prior Publication Data
US 2018/0312423 A1    Nov. 1, 2018

Related U.S. Application Data

(60) Provisional application No. 62/249,567, filed on Nov. 2, 2015.

(51) Int. Cl.
  *C03B 35/20* (2006.01)
  *C03B 23/035* (2006.01)
  *C03B 23/025* (2006.01)

(52) U.S. Cl.
  CPC ........ *C03B 35/207* (2013.01); *C03B 23/0258* (2013.01); *C03B 23/0357* (2013.01)

(58) Field of Classification Search
  CPC .............. C03B 35/145; C03B 23/0258; C03B 23/0357; C03B 2225/02
  See application file for complete search history.

(56) References Cited

U.S. PATENT DOCUMENTS

| | | |
|---|---|---|
| 3,778,244 A | 12/1973 | Nedelec et al. |
| 3,806,312 A | 4/1974 | McMaster et al. |

(Continued)

FOREIGN PATENT DOCUMENTS

| | | |
|---|---|---|
| BE | 480412 A | 2/1948 |
| CN | 1047665 A | 12/1990 |

(Continued)

OTHER PUBLICATIONS

Extended European Search Report dated Jun. 4, 2019, Application No. 16862845.1-1105 / 3371118, PCT/US2016/060059, Applicant Glasstech, Inc., 12 Pages.

(Continued)

*Primary Examiner* — Lisa L Herring
(74) *Attorney, Agent, or Firm* — Brooks Kushman P.C.

(57) ABSTRACT

A vacuum mold shuttle system in a glass sheet forming system includes a vacuum mold mounted on a support frame. A shuttle frame including a pair of generally parallel elongate beams for receiving and supporting the mold support frame thereon. A vacuum source is mounted on the shuttle frame near the end of the beams opposite to the end supporting the mold, a conduit and coupling port for releasably connecting the mold to the vacuum source. At least one guide element is mounted on the support surface of one of the beams for receiving and fixing the position of the mold support frame relative to the shuttle frame to align and (Continued)

prevent movement of the mold support frame with respect to the shuttle frame in any direction as the mold support frame is supported thereon.

20 Claims, 6 Drawing Sheets

(56) References Cited

U.S. PATENT DOCUMENTS

| | | | |
|---|---|---|---|
| 3,934,970 | A | 1/1976 | McMaster et al. |
| 3,947,242 | A | 3/1976 | McMaster et al. |
| 3,994,711 | A | 11/1976 | McMaster |
| 4,202,681 | A | 5/1980 | McMaster et al. |
| 4,204,854 | A | 5/1980 | McMaster et al. |
| 4,222,763 | A | 9/1980 | McMaster |
| 4,356,018 | A | 10/1982 | McMaster |
| 4,432,782 | A | 2/1984 | Seymour |
| 4,617,042 | A | 10/1986 | Reunamaki |
| 4,661,141 | A | 4/1987 | Nitschke et al. |
| 4,883,526 | A | 11/1989 | Enk et al. |
| 5,143,535 | A * | 9/1992 | Herrington ............ C03B 23/03 65/106 |
| 5,230,728 | A | 7/1993 | McMaster |
| 5,279,635 | A * | 1/1994 | Flaugher ............ C03B 23/0307 65/103 |
| 5,330,550 | A | 7/1994 | Kuster et al. |
| 5,336,288 | A | 8/1994 | Carlomagno et al. |
| 5,900,034 | A | 5/1999 | Mumford et al. |
| 5,906,668 | A | 5/1999 | Mumford et al. |
| 5,917,107 | A * | 6/1999 | Ducat ................. C03B 23/0302 65/273 |
| 5,925,162 | A | 7/1999 | Nischke et al. |
| 5,951,733 | A | 9/1999 | Clark et al. |
| 6,015,512 | A | 1/2000 | Yang et al. |
| 6,173,587 | B1 | 1/2001 | Mumford et al. |
| 6,378,339 | B1 | 4/2002 | Zalesak et al. |
| 6,718,798 | B2 | 4/2004 | Nitschke et al. |
| 6,729,160 | B1 | 5/2004 | Nitschke et al. |
| 7,716,949 | B2 | 5/2010 | Bennett et al. |
| 8,132,428 | B2 | 3/2012 | Vild et al. |
| 9,334,186 | B2 * | 5/2016 | King .................. C03B 23/0302 |
| 9,452,948 | B2 | 9/2016 | Nitschke et al. |
| 10,011,514 | B2 | 7/2018 | Nitschke et al. |
| 10,246,364 | B2 | 4/2019 | Nitschke et al. |
| 2002/0009602 | A1 | 1/2002 | Kitayama et al. |
| 2003/0106340 | A1 | 6/2003 | Nitschke et al. |
| 2007/0089459 | A1 | 4/2007 | Vild et al. |
| 2008/0271489 | A1 | 11/2008 | Taplan et al. |
| 2015/0218029 | A1 | 8/2015 | Nitschke et al. |
| 2018/0339928 | A1 | 11/2018 | Nitschke et al. |

FOREIGN PATENT DOCUMENTS

| | | | |
|---|---|---|---|
| CN | 1289287 | A | 3/2001 |
| CN | 1311761 | A | 9/2001 |
| CN | 1452600 | A | 10/2003 |
| CN | 101291883 | A | 10/2008 |
| CN | 101801865 | A | 8/2010 |
| CN | 103987669 | A | 8/2014 |
| EP | 0 668 249 | A2 | 8/1995 |
| EP | 1 348 672 | A2 | 10/2003 |
| JP | S58223626 | a | 12/1983 |
| JP | H06502615 | A | 3/1994 |
| JP | 2001524440 | A | 12/2001 |
| JP | 2017507883 | A | 3/2017 |
| RU | 2 025 468 | C1 | 12/1994 |
| RU | 2081067 | C1 | 6/1997 |
| RU | 2 083 512 | C1 | 7/1997 |
| RU | 2 092 460 | C1 | 10/1997 |
| SU | 795632 | A1 | 1/1981 |
| SU | 844102 | A1 | 7/1981 |
| WO | 92/01638 | A1 | 2/1992 |
| WO | 99/26890 | A1 | 6/1999 |
| WO | 2007/050297 | A2 | 5/2007 |
| WO | 2015/119752 | A1 | 8/2015 |
| WO | 2017079251 | A1 | 5/2017 |

OTHER PUBLICATIONS

Chinese First Office Action dated Dec. 20, 2018, Application No. 201680063765.7, 5 Pages.
Extended European Search Report dated Jul. 18, 2019, Application No. 16862861.8, Applicant Glasstech, Inc., 9 Pages.
Chinese Second Office Action dated Aug. 12, 2019, Application No. 201680063765.7, 5 Pages.
U.S. Patent and Trademark Office, International Search Report and Written Opinion of International Application No. PCT/US2016/060090, dated Jan. 23, 2017.
U.S. Patent and Trademark Office, International Search Report and Written Opinion of International Application No. PCT/US2016/060059, dated Mar. 31, 2017.
Brazilian Preliminary Examination Report dated Mar. 25, 2020 (with English Machine Translation), Application No. BR112018008804-8, Applicant Glasstech, Inc. (9 Pages).
Russian Office Action & Search Report dated Mar. 20, 2020 (with English Machine Translation), Application No. 2018119349/03(030432), Applicant Glasstech, Inc. (13 Pages).
Brazilian Preliminary Report dated Feb. 27, 2020 (with English Machine Translation), Application No. BR112018008801-3, Applicant Glasstech, Inc. (8 Pages).
Russian Acceptance Decision & Search Report dated Feb. 20, 2020 (with Partial English Translation of Decision & Search Report), Application No. 2018119496/03, Applicant Glasstech, Inc. (19 Pages).
Chinese First Office Action & Search Report dated Jun. 5, 2020, Application No. 201680064115.4, Applicant Glasstech, Inc., 17 Pages.
Indian Examination Report dated Aug. 26, 2020, Application No. 201817019805, Applicant Glasstech, Inc., 6 Pages.
Indian Examination Report dated Sep. 26, 2020, Application No. 201817019803, Applicant Glasstech, Inc., 7 Pages.
Japanese Search Report dated Sep. 7, 2020 (with English Translation), Application No. 2018-522062, 30 Pages.
Japanese Notice of Allowance dated Nov. 4, 2020 (with Englsih Translation), Application No. 2018-522062, 6 Pages.
Japanese Office Action dated Nov. 4, 2020, (with English Machine Translation), Application No. 2018-522001, 6 Pages.
U.S. Non-Final Office Action dated Nov. 19, 2020, U.S. Appl. No. 15/773,604, 76 Pages.

* cited by examiner

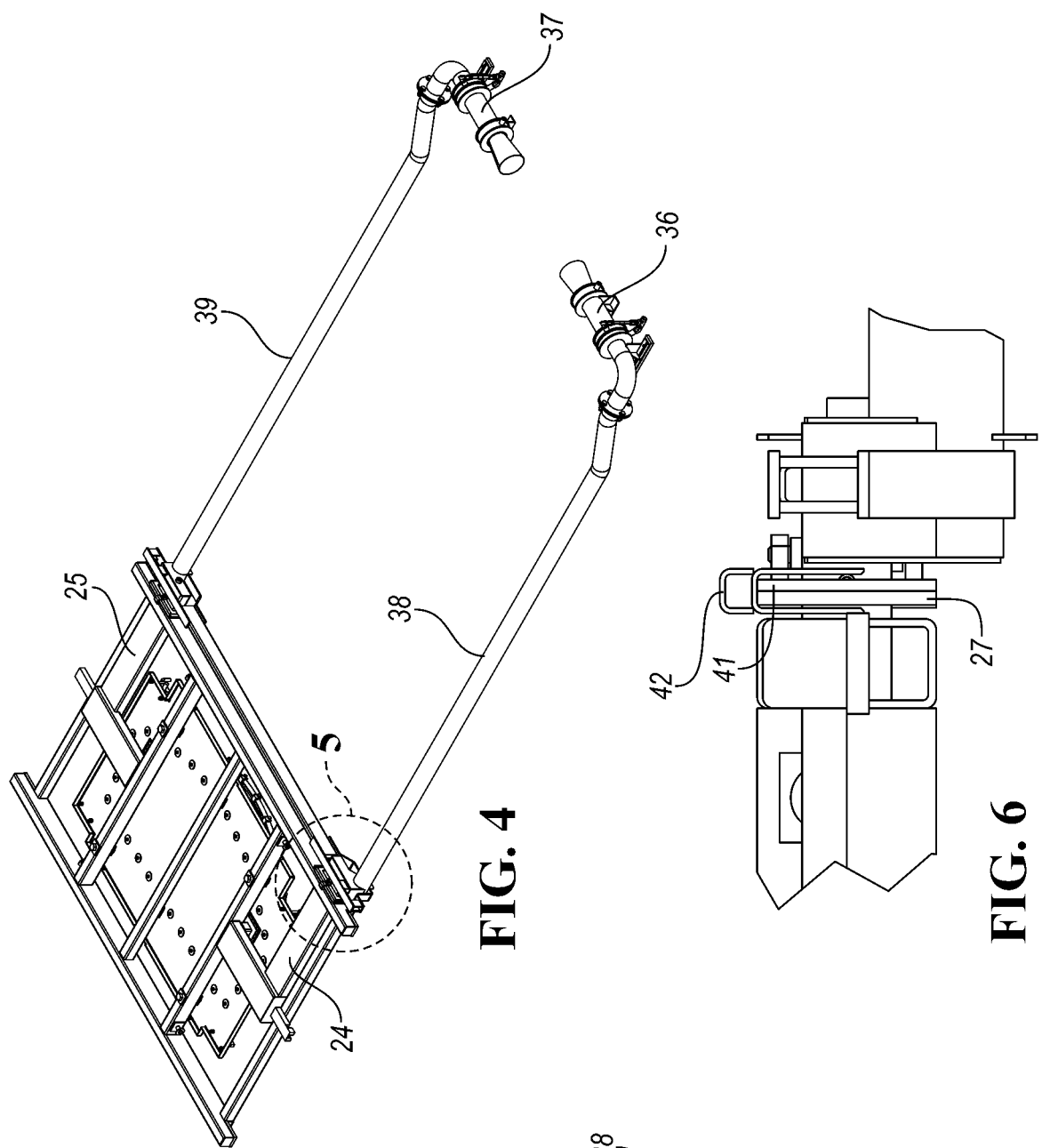
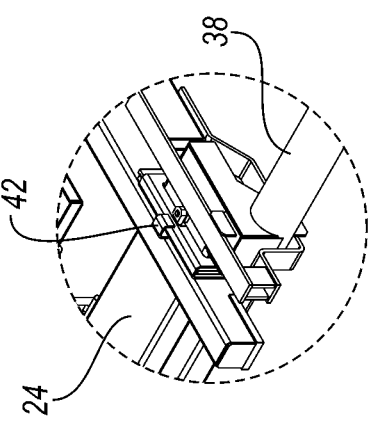
FIG. 4
FIG. 5
FIG. 6

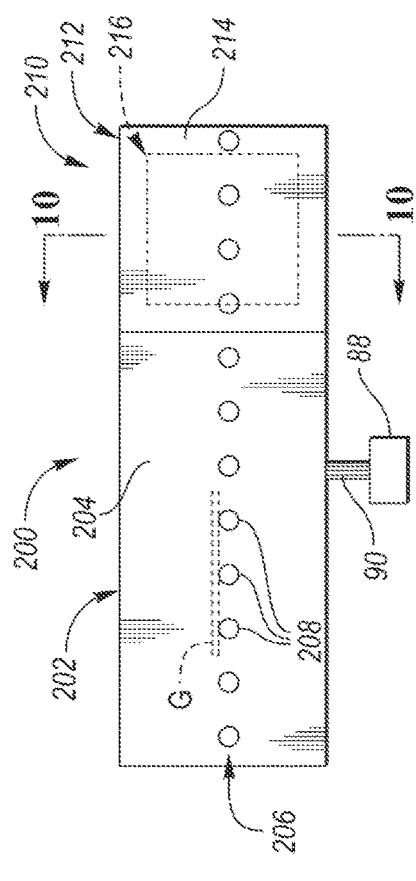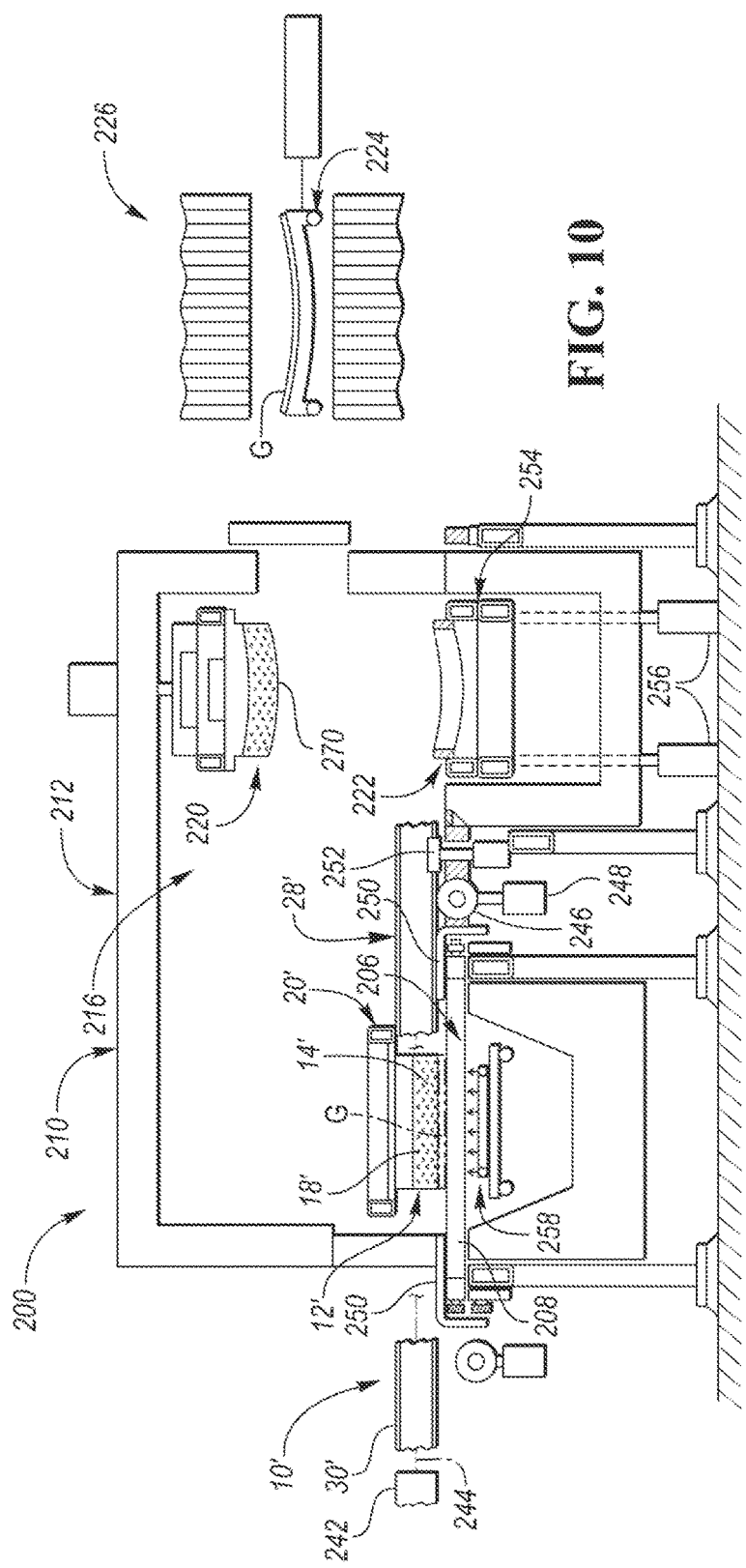

VACUUM MOLD SHUTTLE SYSTEM FOR A GLASS SHEET FORMING SYSTEM

CROSS-REFERENCE TO RELATED APPLICATION

This application is the U.S. national phase of PCT Application No. PCT/US2016/060090 filed on Nov. 2, 2016, which claims the benefit of U.S. provisional Application No. 62/249,567, filed on Nov. 2, 2015, the disclosures of which are incorporated in their entirety by reference herein.

TECHNICAL FIELD

This invention relates to a vacuum mold shuttle system and method for forming and transporting a hot glass sheet in a glass sheet bending system.

BACKGROUND

Prior shuttle apparatuses for moving molds in multi-stage glass sheet forming systems are disclosed in U.S. Pat. No. 5,900,034, Mumford et al.; U.S. Pat. No. 5,906,668 Mumford et al.; U.S. Pat. No. 5,925,162 Nitschke et al.; U.S. Pat. No. 6,173,587 Mumford et al.; U.S. Pat. No. 6,718,798 Nitschke et al.; and U.S. Pat. No. 6,729,160 Nitschke et al., for example.

SUMMARY

A vacuum mold shuttle system, according to the disclosure, for forming a hot glass sheet in a glass processing system includes a mold having a full downwardly facing surface that defines an initial shape to which the glass sheet is to be formed. The mold includes a vacuum chamber having a set of openings that extend from the surface of the mold into the vacuum chamber.

The shuttle system also includes a mold support frame including at least one connection surface for mounting the mold thereon, and at least one mold conduit operably connected at a first location to the vacuum chamber and including an opening at a second location defining a first coupling port. The shuttle system also includes a shuttle frame including a pair of generally parallel elongate beams, each of the beams including at least one support surface near one end of the beam for receiving and supporting the mold support frame thereon.

At least one vacuum source is mounted on the shuttle frame near the end of the beam opposite to the end including the mold support frame support surface, and a shuttle conduit operably connected at a first location to the vacuum source. The shuttle conduit includes an opening at a second location defining a second coupling port. A connector for releasably connecting the first coupling port to a second coupling port to provide communication of the vacuum from the vacuum source through the shuttle conduit and through the mold conduit to the vacuum chamber of the mold for selectively drawing a vacuum at the downwardly facing surface of the mold.

According to another aspect of the disclosure, at least one guide element may be mounted on the support surface of one of the beams for receiving and fixing the position of the mold support frame relative to the shuttle frame to prevent movement of the mold support frame with respect to the shuttle frame in any direction as the mold support frame is supported thereon. At least one other guide element may be provided, which guide element is mounted on the support surface of the other one of the beams for receiving and fixing the position of the mold support frame relative to the shuttle frame to prevent movement of the mold support frame in a first direction with respect to the shuttle frame, but allow movement of the mold support frame in a second direction with respect to this support frame as the mold support frame is supported thereon.

According to another aspect of the disclosure, a vacuum mold shuttle system as described herein is provided for use in a three stage forming station for forming a hot glass sheet, wherein the shuttle system includes a first upper mold having a full downwardly facing surface that defines an initial shape to which the glass sheet is to be formed in the first stage of the forming process. According to the disclosed embodiment, the three stage forming station includes an upwardly facing lower mold which receives the glass sheet from the first upper mold so the glass sheet then sags under gravity. A downwardly facing second upper mold of the forming station is complementary to the upwardly facing lower mold and cooperates with the lower mold to press form the glass sheet with curvature corresponding to the shapes of the lower mold and the second upper mold.

According to another aspect of the disclosure, the three stage forming station also includes a conveyor from which the first upper mold receives the glass sheet prior to the shuttle, including the first upper mold, being moved horizontally to position the glass sheet above the lower mold, which then receives the glass sheet for subsequently performing the press forming with the second upper mold. This disclosed embodiment also includes a housing having a heated chamber, and has the conveyor embodied by a roll conveyor for conveying the hot glass sheet into the heated chamber of the housing along a horizontal plane of conveyance. The shuttle is movable horizontally within the heated chamber to position the first upper mold between a pickup position above the roll conveyor and a delivery position above the lower mold which is spaced horizontally from the pickup position. In this embodiment, the vacuum source for the first upper mold may be located at the end of the mold shuttle frame most distant from the heating chamber to reduce exposure of the vacuum sources to the relatively high temperatures encountered by the first upper mold.

A gas lift jet array may be located below the plane of conveyance to supply upwardly directed lift jets for lifting the glass sheet upwardly from the roll conveyor to the first upper mold when located in its pickup position to initially form and support the glass sheet against the downwardly facing surface of the first upper mold. The second upper mold is spaced laterally within the heated chamber from the pickup position of the first upper mold and is movable vertically between an upper position located above the elevation of the plane of conveyance and a lower position closer to the elevation of the plane of conveyance, and the second upper mold has a downwardly facing surface of a downwardly convex shape that further defines the desired curvature of the glass sheet.

A second vacuum source may be provided to selectively draw a vacuum at the downwardly facing surface of the second upper mold. The lower mold is located within the heated chamber below the second upper mold and is also below the first upper mold after movement of the shuttle and first upper mold to its delivery position with the glass sheet supported thereon by vacuum drawn by the shuttle vacuum source. The shuttle vacuum may then be terminated to release the glass sheet onto the lower mold, and the shuttle operated to move the first upper mold back to its pickup position.

The second upper mold is then moved downwardly from its upper position to its lower position to cooperate with the lower mold to further press form the glass sheet, and the second upper mold is subsequently moved upwardly to its upper position with the press formed glass sheet supported on the second upper mold by vacuum drawn at its downwardly facing surface by the vacuum source associated with the second upper mold.

A delivery mold is moved to below the press formed glass sheet on the second upper mold in its upper position whereupon the vacuum is terminated and the glass sheet is released from the second upper mold onto the delivery mold which is then moved out of the forming station for delivery of the press formed glass sheet.

One or more controllers may be utilized to operate the heating chamber, the roll conveyor, the shuttle system including the first upper mold, the gas lift jet array, the second upper mold, the vacuum sources, the lower mold, and the delivery mold to perform the press forming of the glass sheet and its delivery.

While exemplary embodiments are illustrated and disclosed, such disclosure should not be construed to limit the claims. It is anticipated that various modifications and alternative designs may be made without departing from the scope of the disclosure.

BRIEF DESCRIPTION OF THE DRAWINGS

FIG. 4 is an isolated perspective view of the mold, mold support frame, vacuum conduit, and vacuum sources employed in the embodiment of FIG. 1.

FIG. 5 is an enlarged, perspective view of one of the coupling ports of FIG. 4.

FIG. 6 is a partial side view of the coupling port shown in FIG. 5, showing the first and second coupling ports connected.

FIG. 7 is a partial perspective view of a support surface on one of the shuttle beams including a guide element, with the companion portion of the mold frame removed.

FIG. 8 is a partial perspective view of a support surface on the other of the shuttle beams including another guide element, with the companion portion of the mold frame removed.

FIG. 9 is a schematic elevational view of a glass sheet processing system including a three stage forming station that may employ the disclosed vacuum mold shuttle system for three stage forming of a hot glass sheet.

FIG. 10 is a sectional view taken through the forming station along the direction of line 10-10 in FIG. 9 illustrating one embodiment of the three stage forming station of the invention that includes first and second upper molds, a lower mold and a delivery mold for performing three stage forming of a hot glass sheet with compound curvature.

DETAILED DESCRIPTION

As required, a detailed embodiment of the present invention is disclosed herein. However, it is to be understood that the disclosed embodiment is merely exemplary of the invention that may be embodied in various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to practice the present invention.

Figure 1:
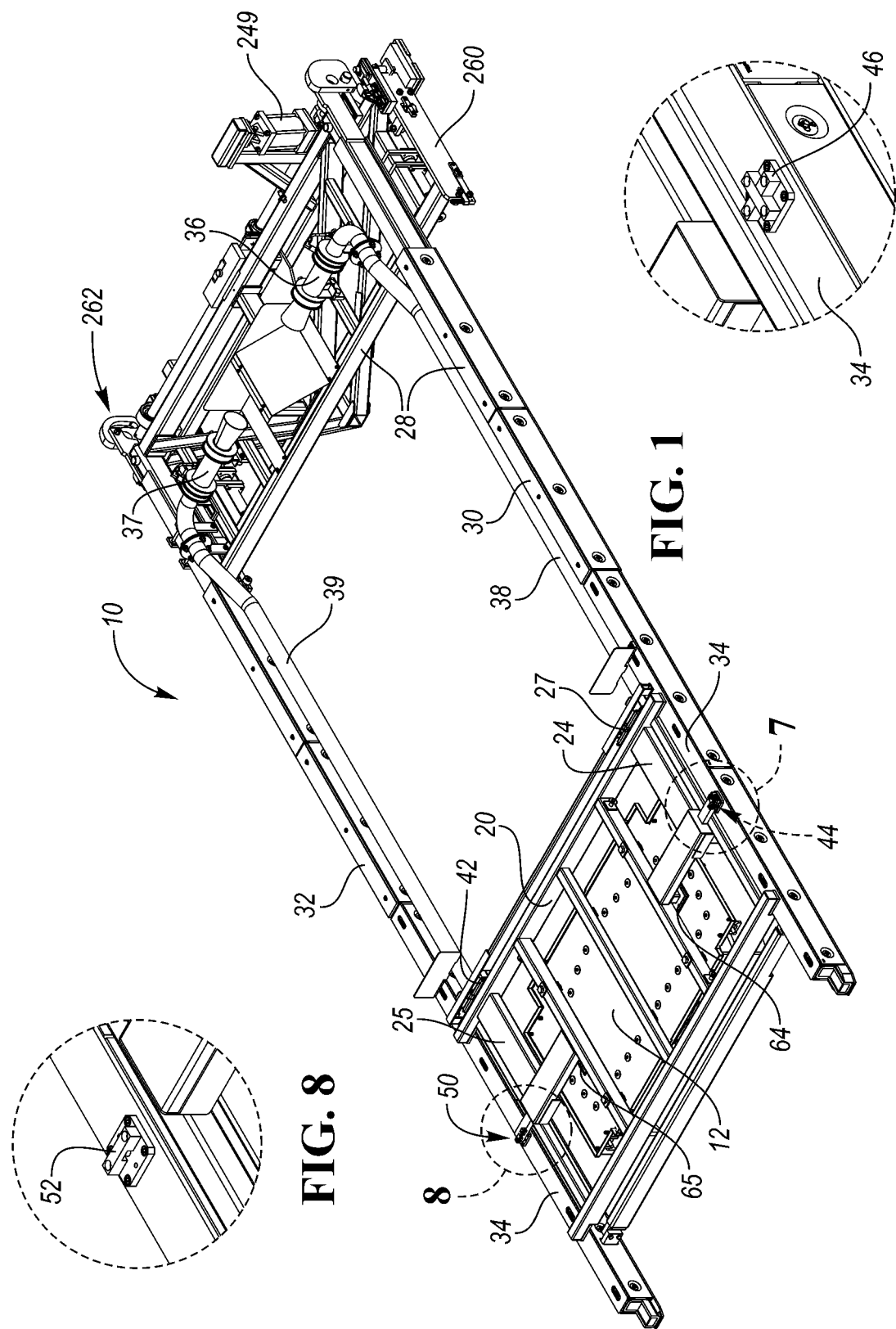
FIG. 1 is a perspective view of an embodiment of a vacuum mold shuttle system according to the disclosure.
Figure 2:
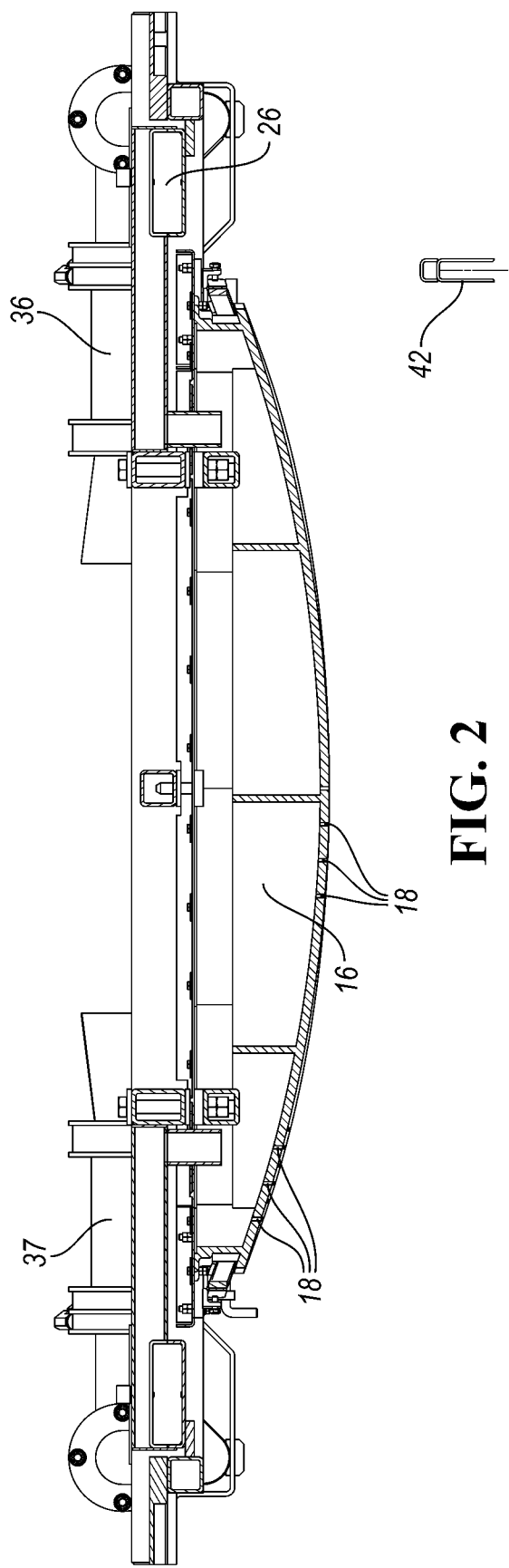
FIG. 2 is a cross-sectional end view of the mold and mold support frame of the embodiment of FIG. 1, taken along line 2-2 of FIG. 3 and viewed in the direction of the arrows.
Figure 3:
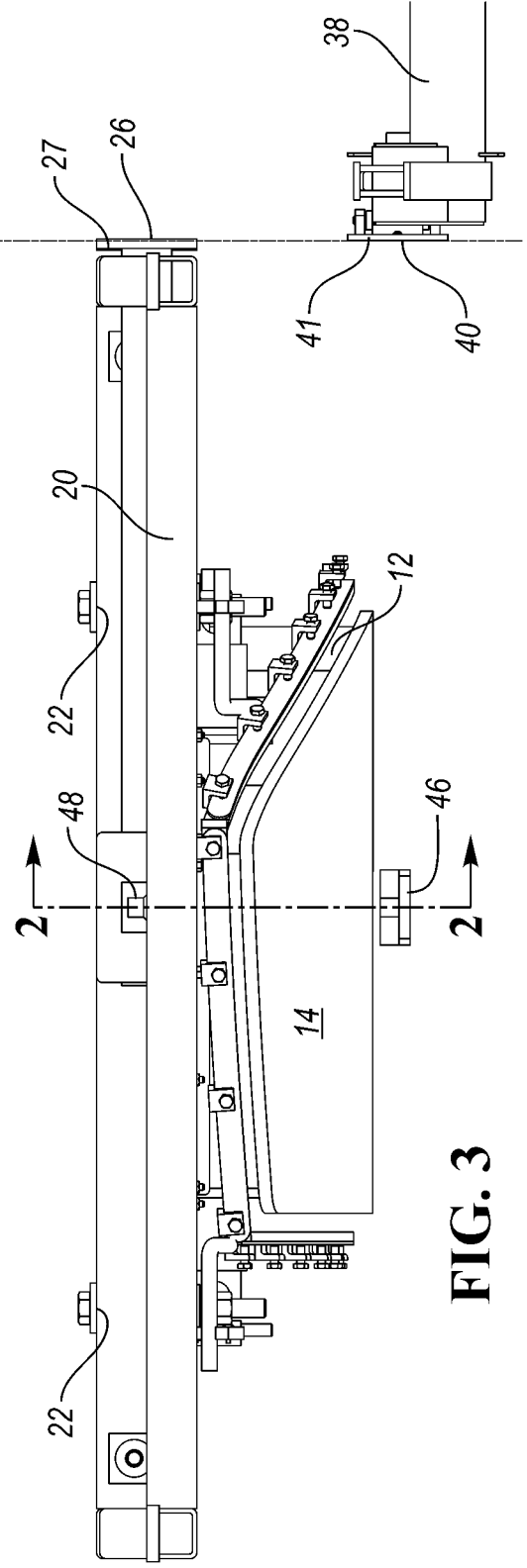
FIG. 3 is a partial side view of the mold, mold support frame, and vacuum conduit showing the first and second coupling ports disconnected and displaced vertically.

With reference to FIGS. 1-3, the vacuum mold shuttle system for forming a hot glass sheet, generally indicated as 10, includes a mold 12 having a full downwardly facing surface 14 that defines the initial shape to which the glass sheet is to be formed. The mold 12 also includes a vacuum chamber 16 having a set of openings 18 that extend to the surface 14 from the vacuum chamber 16. A mold support frame 20 includes at least one connection surface 22 for mounting the mold thereon, and at least one mold conduit 24 operably connected at a first location 64 to the vacuum chamber 16. An opening defining a first coupling port 26 is provided at a second location on the mold conduit 24.

The disclosed vacuum mold shuttle system 10 also includes a shuttle frame 28 including a pair of generally parallel elongated beams 30, 32. Each of the beams 30, 32 includes at least one support surface 34 near one end of the beam for receiving and supporting the mold support frame 20 thereon. Each of beams 30, 32 may be water-cooled to limit the thermal expansion or contraction of the beams that may result as portions of the beams are moved into and out of the heated ambient as the mold 12 is moved within the heated ambient.

At least one vacuum source 36 may be mounted on the shuttle frame 28 near the end of the beam 30 opposite the mold support frame 20. At least one shuttle conduit 38 is operably connected at a first location to the vacuum source 36, and includes an opening at a second location defining a second coupling port 40. A connector 42 for releasably connecting the first coupling port 26 to the second coupling port 40 to provide communication of the vacuum from the vacuum source 36 through the shuttle conduit 38 and the mold conduit 24 for selectively drawing a vacuum (and/or creating a positive pressure) at the downwardly facing surface 14 of the mold 12.

Referring to FIGS. 1-6, in the disclosed embodiment, the vacuum source is provided by positive pressure air supplied to a pair of gas jet pumps 36, 37 mounted on the shuttle frame 28 at the end opposite the end where the mold frame 20 is located. A pair of mold conduits 24, 25 are operably connected at one end to the vacuum chamber 16 of the mold 12 (such as, for example, at locations 64, 65), and each includes an opening at the other end including a connector plate 27 defining a first coupling port 26. In this disclosed embodiment, each gas jet pump 36, 37 is operably connected to a separate shuttle conduit 38, 39 which is shaped to extend along, and where possible, within the height profile of, the beams, 30, 32, to the end of the shuttle at which the mold 12 is supported. Each of the shuttle conduits 38, 39 include an opening at the end nearest the mold 12 including a connector plate 41 defining a second coupling port 40, such that when the mold 12 is installed on the shuttle frame 28 the first coupling port 26 on each of the mold conduits 24, 25 aligns with the second coupling port 40 on each of the shuttle conduits 38, 39. A retainer clip 42 is then slidably positioned over the connector plates 27 and 41 to couple the conduits 38 and 24 (and 39 and 25) and connect the vacuum chamber 16 of the mold 12 with the vacuum sources 36, 37.

Gas jet pumps 36, 37 may be of the type disclosed by U.S. Pat. No. 4,202,681 McMaster and U.S. Pat. No. 4,222,763 McMaster so as to be capable of drawing greater and lesser extents of vacuums as well as providing positive pressure air for providing glass sheet release during the forming operation as is hereinafter more fully described.

Referring to FIGS. 1, 3 and 7, in the disclosed embodiment, a first guide element 44 is mounted on one of the support surfaces 34 of one of the beams 30 to receive and fix the position of the mold 12 relative to the shuttle frame 28. The first guide element 44 may include alignment key 46 which is fixed to and extends upwardly from the beam support surface 34 (or, alternatively, projects downwardly from the mold frame 20), and a complimentary receiver keyway 48 located on the mold support frame 20 (or, alternatively, on the beam support surface 34) such that, when the mold 12 and mold support frame 20 are installed on the shuttle frame 28, alignment key 46 is received within keyway 48, thereby aligning the mold 12 in a fixed position. In the disclosed embodiment, the key 46 and keyway 48 are shaped as a "+", such that engagement of the key in the keyway 48 assures that the mold frame 20 is fixed in position relative to beam 30 at the location of the guide 44. It will be appreciated the key 46 and keyway 48 may alternatively be configured in other shapes, such as an "X", so long as engagement of key 46 within keyway 48 restricts all movement of the mold frame 20 with respect to the beam 30 at this location.

Referring to FIGS. 1 and 8, a second guide 50 may be located on the other beam 32 to register the mold frame 20 in the desired location on beam 32. In the disclosed embodiment, the guide 50 associated with beam 32 includes a second key 52 and complimentary shaped keyway which are mounted, respectively, on beam 32 and mold frame 20 (or vice versa) to fix the positioning mold frame 20 along one axis (such as the length) of the beam 32, but allow for movement of mold frame 20 along another axis (such as the width) of the beam 32. In the disclosed embodiment, the second key 52 is shaped as a "–", and the corresponding keyway is a slot which is suitably sized to accept the key 52 therein and prevent movement of the mold frame 20 with respect to beam 32 in one direction (such as, for example, along the length of the shuttle frame), but allow the key to slide in another direction (such as, for example, transverse to the length of the shuttle frame).

By utilizing the first guide 44 and second guide 50 in these described shapes, the mold 12 and mold frame 20 are aligned at a fixed position in one direction (e.g., along the length) on the shuttle support beams 30, 32. In addition, mold frame 20 is fixed in position in all directions at first guide 44 with respect to beam 30, but mold frame 20 is allowed to move with respect to beam 32 in a direction transverse to the length of beam 32 at second guide 50. This arrangement thus aligns the mold at a fixed point on the shuttle frame 28 at guide 44, but allows for, for example, any thermal expansion or contraction that may result as the mold 12 and frame 20 are moved into and out of the heated ambient by allowing the mold frame 20 (and mold 12) to move with respect to the shuttle beam 32 in a selected direction (e.g., transverse to the length of beam 32) at guide 50.

Referring now to FIGS. 9 and 10, the disclosed vacuum mold shuttle system may be employed in a glass sheet forming system generally indicated by 200 which includes a furnace 202 having a heating chamber 204 for providing a heated ambient for heating glass sheets. A conveyor 206 of the system conveys the heated glass sheet in a generally horizontally extending orientation and is preferably of the roll conveyor type including rolls 208 like those disclosed by U.S. Pat. No. 3,806,312 McMaster; U.S. Pat. No. 3,934,970 McMaster et al., U.S. Pat. No. 3,947,242 McMaster et al.; and U.S. Pat. No. 3,994,711 McMaster et al. A three stage forming station 210 of the system 200 is constructed according to the present disclosure and performs the method thereof such that both the forming station and the forming method are described in an integrated manner to facilitate an understanding of different aspects of the disclosure. The forming station 210 has a construction with press forming somewhat similar to that of the disclosure of the aforementioned U.S. Pat. No. 4,661,141 and the other United States patents set forth in the above Background section of this application. Furthermore, the forming station 210 has an insulated housing 212 defining a heated chamber 214 in which forming apparatus 216 of the forming station is located as best shown in FIG. 10.

Figure 11:
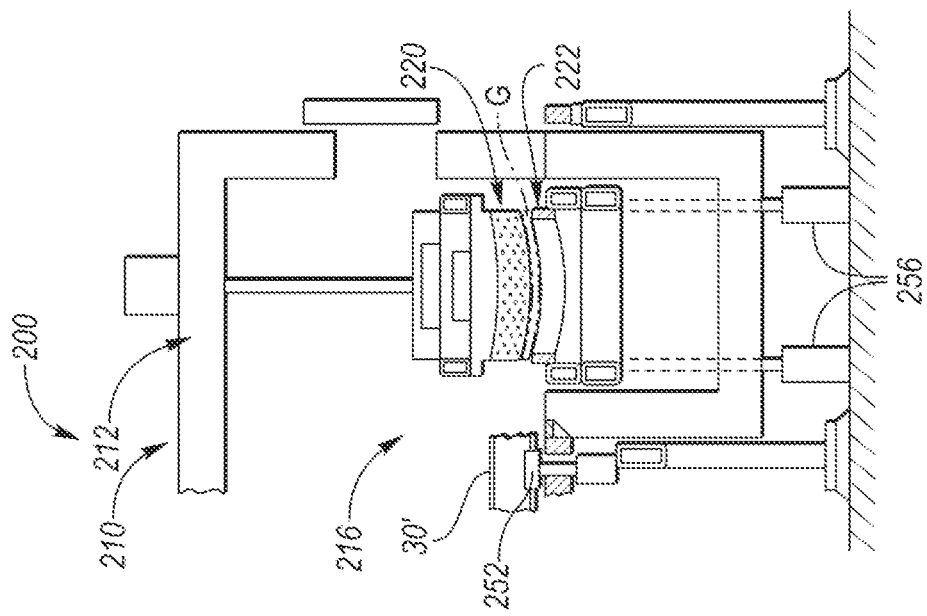
FIGS. 11 and 12 are partial views of FIG. 10 illustrating the glass sheet processing during a cycle of operation of the system.
Figure 12:
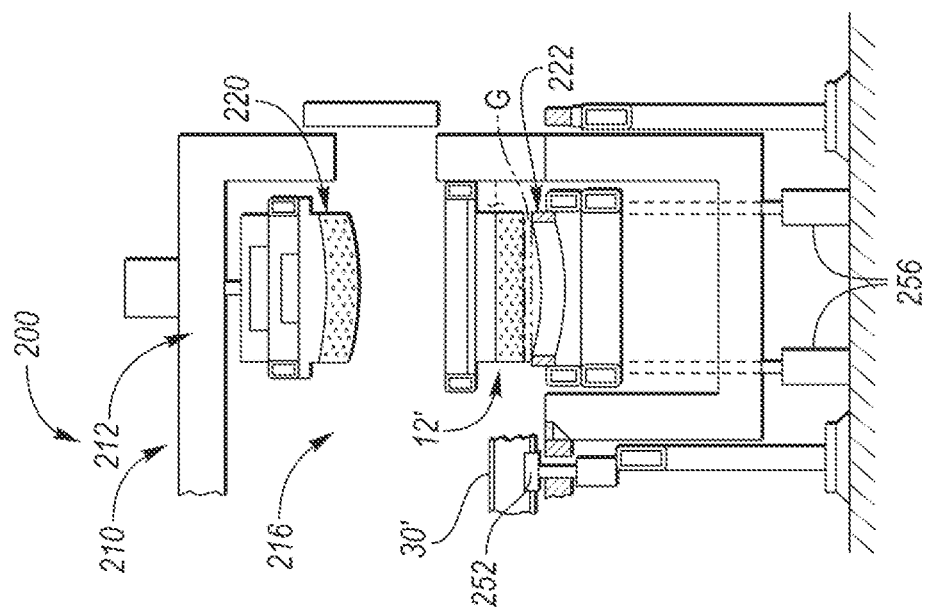

As illustrated in FIGS. 10-12, the glass sheet forming apparatus 216 may employ the disclosed vacuum mold shuttle system 10', including a first upper mold 12' that picks up the softened glass sheet from the heater conveyor 206 during a first stage of the hot glass sheet forming, then moves the glass sheet horizontally to a delivery position shown in FIG. 11 where a lower mold 222 is located, and releases the glass sheet G onto the lower mold 222 for gravity sagging. As such, there is a relatively limited time for gravity sagging so that the shape can be more accurately controlled.

After the glass sheet is deposited on the lower mold 222 by the first upper mold 12', the first upper mold 12' moves back from its delivery position of FIG. 11 to its pickup position of FIG. 10 and the second upper mold 220 moves downwardly as shown in FIG. 12 to cooperate with the lower mold 222 in press forming the glass sheet. Some vacuum forming of the glass on the facing surface 270 of the second upper mold 220 may also be accomplished if desired. After press forming, the second upper mold 220 moves upwardly with the glass sheet supported against its downwardly facing surface 270 by a drawn vacuum and the delivery mold 224 shown in FIG. 10 is moved from a post-forming station (such as, for example, the quench station 226) into the forming station 210 to receive the formed glass sheet for movement out of the forming station 210 (such as to the quench station 226 of the disclosed embodiment) for further processing.

As shown in FIG. 10, in this disclosed embodiment the first upper mold 12' has a support frame 20' that is supported by a shuttle frame 28' including elongated beams 30', 32' (only one shown) that are moved by an actuator 242 through a connection 244. These beams 30', 32' are supported at one end by one or more associated rollers 246 that are mounted by one or more actuators 248. The other ends of the beams 30', 32' may be supported by a carriage 260 (best shown in FIG. 1) which may include a vertical lift mechanism 262 powered by an actuator 249 (see FIG. 1). In this embodiment, rollers 246, lift mechanism 262 and their associated actuators 248 and 249 may be controlled to provide vertical movement of the beams (and hence vertical movement of the first upper mold 12') during its operation. More specifically, the first upper mold 12' can be moved downwardly to about one half inch (12 to 15 mm) from the conveyor 206 for the initial pickup of the glass sheet and can then be moved upwardly so as to move above covers 250 located above the ends of the conveyor rolls 208. Lateral rollers 252 also contact one of the beams 30' to provide lateral positioning during movement of the first upper mold 12' between its pickup position shown in FIG. 10 and its delivery position shown in FIG. 11. It should be appreciated that one embodiment of the shuttle positioning system including rollers 246 and 252 is disclosed in U.S. Patent Application Ser. No. 62/249,697, the disclosure of which is incorporated herein in its entirety.

Station 210, illustrated in FIGS. 10-12, thus has three stages of operation wherein the glass sheet may be formed on the first upper mold 12' with curvature in a first direction and straight line elements in a second direction transverse to the first direction, by gravity on the lower mold 222 after receipt thereby from the first upper mold 12' in its delivery position shown in FIG. 11, and finally by the press forming between the second upper mold 220 and the lower mold 222 and/or vacuum forming on the second upper mold 220 as shown in FIG. 12. It will be appreciated that the disclosed vacuum mold shuttle system 10 may be employed in other multi-stage forming systems, such as other embodiments of three stage forming systems, which forming systems may include additional details as are disclosed in U.S. Pat. No. 9,452,948 B2, entitled "Three Stage Forming Station And Method For Forming A Hot Glass Sheet With Transverse Curvature", the disclosure of which is incorporated herein in its entirety.

Referring again to FIG. 10, the lower mold 222 as illustrated may be supported by a framework 254 that is supported by actuators 256, such as screw jacks, for vertical movement. This vertical movement can be downward to allow the first upper mold 12' to move over the lower mold 222 and then upward so that the release of the glass sheet is at a more closely spaced relationship to control positioning. In addition, the vertical movement of the lower mold 222 can also be used in cooperation with the vertical movement of the second upper mold 220 to perform the press bending.

A gas lift jet array 258 may be included in the forming station as illustrated in FIG. 10. The gas lift jet array 258 is located below the plane of conveyance C of the hot glass sheet and includes gas jet pumps that supply upwardly directed gas jets for lifting the glass sheet G upwardly from the roll conveyor 206 to initially form and support the glass sheet against the downwardly facing surface 14' of the first upper mold 12' which is then positioned above the lower mold as previously described with the glass sheet supported against its downwardly facing surface as shown in FIG. 11. The gas jet pumps may of the type disclosed by U.S. Pat. No. 4,204,854 McMaster et al. and U.S. Pat. No. 4,356,018 McMaster et al. such that a primary gas flow therefrom induces a secondary gas flow many times the extent of the primary gas flow in order to provide the lifting. A downwardly facing surface 14' of the first upper mold 12' also has an array of vacuum holes 18' through which a vacuum may be drawn to also provide initial lifting of the glass sheet and to then support the glass sheet as is herein described. The release of the glass sheet can be provided by the termination of the vacuum drawn and the termination of the upwardly directed gas jets provided by the gas jet array 258 previously described, as well as by providing positive pressure gas to the mold surface 14'.

It should be appreciated that one embodiment of the gas jet lift array 258 is disclosed in co-pending U.S. patent application Ser. No. 14/929,799, entitled "Lift Device For A Glass Processing System", the disclosure of which is incorporated herein in its entirety.

The system 200 may further include a controller or control unit 88, shown in FIG. 9, for controlling operation of the above components. The control unit 88 may have a bundle of connections 90 for connecting with the various components of the system 200, such as the vacuum sources 36, 37 and the vacuum mold shuttle system actuators 242, 248, and 249 for the first upper mold 12', the heater 204, the roller conveyor system 206, the second upper mold 220, the lower mold 222, the delivery mold 224, and the quench station 226. Furthermore, the control unit 88 may include any suitable hardware and/or software for controlling operation of the above components in order to perform the press forming of the glass sheet G, as well as its delivery and quenching (e.g., for performing the particular algorithms represented by the functions described herein). For example, the control unit 88 may include one or more processors in communication with one or more storage devices or memory units, which include computer readable program instructions that are executable by the one or more processors so that the control unit 88 may control operation of the vacuum mold shuttle 10, as well as the other above-described components of the glass sheet forming system. The control unit 88 may also, or instead, include one or more application specific integrated circuits, programmable gate arrays, programmable logic devices, and/or digital signal processors. In lieu of the connections 90, the control unit 88 may instead be connected wirelessly to one or more of the above components. Furthermore, the control unit of the vacuum mold shuttle system 10 may be part of the control unit 88, or it may be separate from the control unit 88 but configured to communicate with the control unit 88.

During development of the forming station 210, the inventors have determined that glass sheet forming with compound curvature (i.e., curvature about multiple, non-parallel axes) upon initial forming on an upper mold can cause buckling at the central viewing area of the glass sheet due to excess glass at the glass sheet periphery when the flat glass sheet assumes the curvature in crossing directions with no straight line elements, and such buckling results in distorted optics as to transmission and/or reflection in the central viewing area of the glass. It has also been determined that use of a first upper mold with straight line elements during the initial stage of forming, then allowing the gravity sag forming on the lower mold to begin curvature about other axes (e.g., axes transverse to the axes of curvature of the first upper mold), and subsequently performing the final press forming of the glass sheet reduces optical distortions both as to transmission and reflection in the central view area of the formed glass sheet. For purposes of this application, the term "straight line elements" means straight lines between two opposite extremities of the first upper mold surface 14' and of the glass sheet after the first stage of forming, which straight lines have midpoints from which the mold surface and initially formed glass sheet are displaced no more than about 0.5%, and preferably no more than about 0.3%, of the distance between the extremities.

Figure 13:
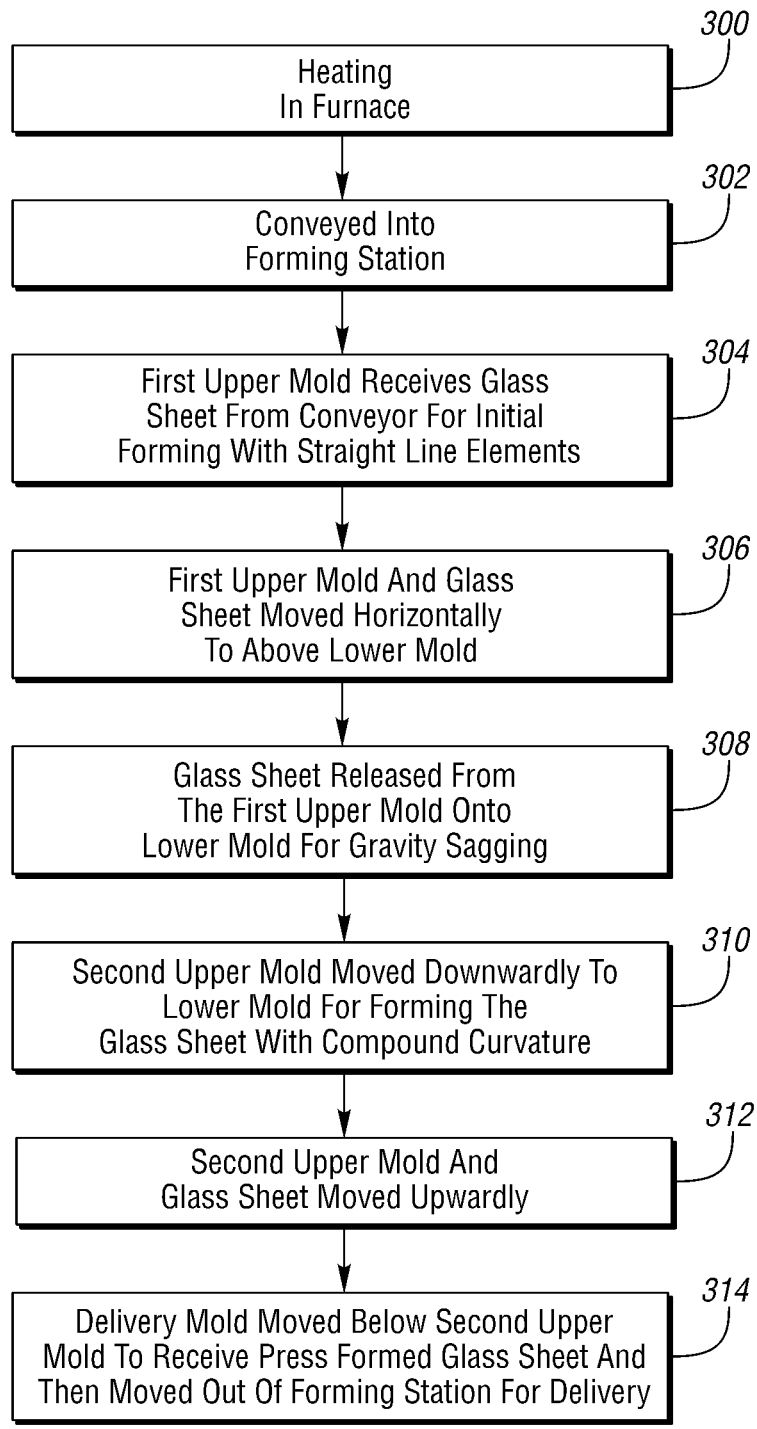
FIG. 13 is a flow chart that illustrates the three stage hot glass sheet forming operation of the forming station embodiment of FIGS. 10-12.

With reference to the flow chart of FIG. 13, the embodiment of FIGS. 10-12 performs the press forming operation beginning, at 300, by the heating of the glass sheet G in the furnace and its subsequent conveyance 302 into the forming station, followed by the first upper mold receiving the glass sheet from the conveyance for initial forming in the first stage, at 304, and then the horizontal movement 306 of the first upper mold and the glass sheet to above the lower mold.

Then, the glass sheet release 308 from the first upper mold onto the lower mold provides gravity sagging in the second stage, and the second upper mold is moved downwardly at 310 to the lower mold for press and/or vacuum forming with compound curvature (including curvature about an axis or axes transverse to the axes of curvature of the first upper mold) in the third stage. The second upper mold and glass sheet are then moved upwardly at 312 followed by the delivery mold movement 314 below the second upper mold to receive the formed glass sheet and then move it out of the forming station for delivery to a post-forming processing station.

The disclosed embodiment of FIGS. 10-12 can have reduced cycle time by the vertical positioning of the constructions disclosed. In this disclosed embodiment, the vertical positioning permits both the first upper mold 12' and the delivery mold 224 to be below the second upper mold 220 at the same time so successive cycles overlap to reduce cycle time.

All of the previously mentioned patents are assigned to the applicant of the present application and are hereby incorporated by reference.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vacuum mold shuttle system for forming a glass sheet comprising:
   a mold including a downwardly facing surface that defines a shape to which the glass sheet is to be initially formed, a vacuum chamber, and openings that extend from the downwardly facing surface to the vacuum chamber;
   a mold support frame including at least one connection surface for mounting the mold thereon, and a mold conduit operably connected at a first location to the vacuum chamber and including an opening at a second location defining a first coupling port;
   a shuttle frame including a pair of generally parallel elongate beams, each of the generally parallel elongate beams including a support surface near one end for receiving and supporting the mold support frame thereon;
   a vacuum source mounted on the shuttle frame near an end of one of the generally parallel elongate beams opposite the end including the support surface;
   a shuttle conduit operably connected at a first location to the vacuum source and including an opening at a second location defining a second coupling port; and
   a connector for releasably connecting the first coupling port to the second coupling port to provide communication of a vacuum from the vacuum source through the shuttle conduit and through the mold conduit to the vacuum chamber for selectively drawing a vacuum at the downwardly facing surface of the mold.

2. The vacuum mold shuttle system as in claim 1 including at least one guide element associated with one of the generally parallel elongate beams for fixing position of the mold support frame relative to the shuttle frame to prevent movement of the mold support frame with respect to the shuttle frame in any direction as the mold support frame is supported thereon, and at least one other guide element associated with the other one of the generally parallel elongate beams for fixing the position of the mold support frame relative to the shuttle frame to prevent movement of the mold support frame in a first direction with respect to the shuttle frame, but allow movement of the mold support frame in a second direction with respect to the shuttle frame as the mold support frame is supported thereon.

3. The vacuum mold shuttle system as in claim 2 wherein each of the at least one guide element and each of the at least one other guide element include a registration surface which is fixed to and projects outwardly from a plane of the support surface of one of the generally parallel elongate beams or a surface of the mold support frame, and a complementary-shaped registration surface which is fixed to and recessed inward from the plane of the support surface of the one of the generally parallel elongate beams or the surface of the mold support frame such that each outwardly projecting registration surface engages a complementary-shaped registration surface to prevent movement of the mold support frame with respect to the shuttle frame in at least one direction.

4. The vacuum mold shuttle system as in claim 1 wherein the vacuum source includes at least one vacuum generator.

5. The vacuum mold shuttle system as in claim 1 wherein the generally parallel elongate beams are water-cooled.

6. The vacuum mold shuttle system as in claim 1 wherein the downwardly facing surface of the mold has curvature in a first direction and straight line elements in a second direction transverse to the first direction for forming the glass sheet with curvature in the first direction while maintaining straight line elements in the second direction.

7. A three stage forming station for forming a glass sheet with compound curvature, the three stage forming station comprising the vacuum mold shuttle system of claim 1, wherein the mold is a first upper mold and the downwardly facing surface is a first upper mold surface having curvature in a first direction and straight line elements in a second direction transverse to the first direction for initially forming the glass sheet with curvature in the first direction while maintaining straight line elements in the second direction, and wherein the three stage forming station further comprises:
   an upwardly facing lower mold, that has curvature at least in the first direction and permits glass sheet curvature in the second direction, for receiving the glass sheet from the first upper mold so the glass sheet is able to sag under gravity along the second direction to have some curvature in the second direction as well as curvature in the first direction; and
   a downwardly facing second upper mold, that has compound curvature and is complementary to the upwardly facing lower mold, for cooperating with the upwardly facing lower mold to form the glass sheet with compound curvature corresponding to the shapes of the upwardly facing lower mold and the downwardly facing second upper mold.

8. The three stage forming station of claim 7 further comprising a conveyor from which the first upper mold may receive the glass sheet prior to the first upper mold with the glass sheet being moved laterally to above the upwardly facing lower mold which is configured to receive the glass sheet for press forming between the upwardly facing lower mold and the downwardly facing second upper mold.

9. The three stage forming station of claim 8 further comprising:
   a housing having a heated chamber;

the conveyor being embodied by a roll conveyor for conveying the glass sheet into the heated chamber of the housing along a horizontal plane of conveyance;

the shuttle frame being movable horizontally to selectively position the first upper mold within the heated chamber between a pickup position above the roll conveyor and a delivery position spaced horizontally from the pickup position;

a gas lift jet array located below the horizontal plane of conveyance to supply upwardly directed lift jets for lifting the glass sheet upwardly from the roll conveyor to the first upper mold when located in its pickup position to initially form and support the glass sheet against the downwardly facing surface of the first upper mold;

the downwardly facing second upper mold being spaced horizontally within the heated chamber from the pickup position of the first upper mold and being movable vertically between an upper position located above an elevation of the horizontal plane of conveyance and a lower position closer to the elevation of the horizontal plane of conveyance, and the downwardly facing second upper mold having a downwardly facing surface of a downwardly convex shape that defines its transverse curvature;

an additional vacuum source for selectively drawing a vacuum at the downwardly facing surface of the downwardly facing second upper mold;

the upwardly facing lower mold being located within the heated chamber below the downwardly facing second upper mold, and also configured to be positioned below the first upper mold after movement of the first upper mold to its delivery position with the glass sheet supported thereon by vacuum drawn by the vacuum source whereupon the vacuum drawn by the vacuum source is terminatable to release the glass sheet onto the upwardly facing lower mold and the first upper mold is movable back to its pickup position;

the downwardly facing second upper mold then being movable downwardly from its upper position to its lower position to cooperate with the upwardly facing lower mold to press form the glass sheet with curvature in transverse directions, and the downwardly facing second upper mold is subsequently movable upwardly to its upper position with the glass sheet supported on the downwardly facing second upper mold by vacuum drawn at its downwardly facing surface by the additional vacuum source;

a delivery mold that is movable to a position below the downwardly facing second upper mold when the downwardly facing second upper mold is in its upper position with the glass sheet on the downwardly facing second upper mold, whereupon the vacuum from the additional vacuum source is terminatable to release the glass sheet from the downwardly facing second upper mold onto the delivery mold which is then movable away from the position below the downwardly facing second upper mold for delivery of the glass sheet; and a controller configured to operate the roll conveyor, the first upper mold, the gas lift jet array, the downwardly facing second upper mold, the vacuum source on the shuttle frame, the additional vacuum source for the downwardly facing second upper mold, the upwardly facing lower mold, and the delivery mold to perform the press forming of the glass sheet and its delivery.

10. The three stage forming station of claim 9 wherein the vacuum source is configured to be operated by the controller to provide vacuum to the downwardly facing surface of the first upper mold to cooperate with the gas lift jet array in lifting the glass sheet from the roll conveyor into contact with the downwardly facing surface of the first upper mold for initial forming and support of the glass sheet.

11. The three stage forming station of claim 10 wherein, after the glass sheet is moved upwardly and contacts the downwardly facing surface of the first upper mold, the controller is configured to terminate operation of the gas lift jet array while continuing to operate the vacuum source to provide the vacuum that is then sole support of the glass sheet on the first upper mold.

12. The three stage forming station as in claim 9 further including a quench station to which the delivery mold is movable to move the glass sheet for quenching.

13. The three stage forming station of claim 7 wherein the upwardly facing lower mold has a ring shape configured to support the glass sheet as it sags by gravity.

14. A three stage forming station for forming a hot glass sheet with transverse curvature, the three stage forming station comprising:

a downwardly facing first upper mold having a downwardly facing surface, a vacuum chamber and openings that extend from the vacuum chamber to the downwardly facing surface, wherein the downwardly facing surface has curvature in a first direction and straight line elements in a second direction transverse to the first direction, for initially forming the hot glass sheet with curvature in the first direction while maintaining straight line elements in the second direction;

a mold support frame including at least one connection surface for mounting the downwardly facing first upper mold thereon, a mold conduit operably connected at a first location to the vacuum chamber and including an opening at a second location defining a first coupling port;

a shuttle frame including a pair of generally parallel elongate beams, each of the generally parallel elongate beams including a support surface near one end for receiving and supporting the mold support frame thereon;

a vacuum source mounted on the shuttle frame near an end of one of the generally parallel elongate beams opposite the end including the support surface;

a shuttle conduit operably connected at a first location to the vacuum source and including an opening at a second location defining a second coupling port;

a connector for releasably connecting the first coupling port to the second coupling port to provide communication of a vacuum from the vacuum source through the shuttle conduit and through the mold conduit to the vacuum chamber for selectively drawing a vacuum at the downwardly facing surface of the downwardly facing first upper mold;

an upwardly facing lower mold, that has curvature in at least the first direction and permits glass sheet curvature in the second direction, for receiving the hot glass sheet from the downwardly facing first upper mold so the hot glass sheet is able to sag under gravity along the second direction to have some curvature in the second direction as well as curvature in the first direction;

a downwardly facing second upper mold, that has compound curvature and is complementary to the upwardly facing lower mold, for cooperating with the upwardly facing lower mold to press form the hot glass sheet with compound curvature corresponding to the shapes of the upwardly facing lower mold and the downwardly facing second upper mold; and a delivery mold for receiving the hot glass sheet from the downwardly facing second upper mold for delivery to a post-forming processing station.

15. The three stage forming station of claim 14 wherein the downwardly facing surface of the downwardly facing first upper mold has a downwardly convex shape, and the downwardly facing second upper mold has a downwardly facing surface of a downwardly convex shape.

16. The three stage forming station of claim 15 wherein the downwardly facing surface of the downwardly facing second upper mold includes an associated array of vacuum holes.

17. The three stage forming station of claim 15 wherein the upwardly facing lower mold has an upwardly concave shape.

18. The three stage forming station of claim 17 wherein the upwardly facing lower mold has a ring shape that defines its upwardly concave shape and is configured to support the hot glass sheet as it sags by gravity.

19. The three stage forming station of claim 14 wherein the downwardly facing surface of the downwardly facing first upper mold has a downwardly convex shape, the downwardly facing second upper mold has a downwardly facing surface of a downwardly convex shape including an associated array of vacuum holes, and the upwardly facing lower mold has a ring shape that defines an upwardly concave shape and is configured to support the hot glass sheet as it sags by gravity.

20. The three stage forming station of claim 14 wherein the upwardly facing lower mold has a ring shape of an upwardly concave shape that has curvature in at least the first direction and permits glass sheet curvature in the second direction; and the downwardly facing second upper mold has a downwardly convex shape with an array of vacuum holes.

* * * * *